United States Patent [19]

Kawakami et al.

[11] Patent Number: 4,654,733
[45] Date of Patent: Mar. 31, 1987

[54] FLOPPY DISC CHUCKING DEVICE

[75] Inventors: Chikahisa Kawakami; Tsuneo Suzuki, both of Tokyo, Japan

[73] Assignees: Kabushiki Kaisha Toshiba, Kawasaki; Toshiba Computer Engineering Corporation, Tokyo, both of Japan

[21] Appl. No.: 688,504

[22] Filed: Jan. 3, 1985

[30] Foreign Application Priority Data

Jan. 10, 1984 [JP] Japan ................................. 59-2403

[51] Int. Cl.$^4$ .......................................... G11B 23/02
[52] U.S. Cl. ..................................... 360/99; 360/133
[58] Field of Search ................. 360/97, 99, 133, 86

[56] References Cited

U.S. PATENT DOCUMENTS 4,320,833  3/1982  Antoniotti et al. ............ 360/133 X

FOREIGN PATENT DOCUMENTS 52-12804   1/1977   Japan ................................. 360/133
57-130237A 12/1982  Japan ................................. 360/133
2108309    5/1983   United Kingdom ................ 360/133

Primary Examiner—John H. Wolff
Attorney, Agent, or Firm—Cushman, Darby and Cushman

[57] ABSTRACT

A floppy disc chucking device is provided for a floppy disc apparatus. The device comprises a permanent magnet for magnetically attracting a metallic chucking plate at the central portion of a floppy disc and a hub having a coupling surface closely in contact with the attracted chucking plate and rotated by a drive mechanism. The coupling surface of the hub is processed to form a coupling layer that has a predetermined thickness and a predetermined high hardness and provides a low coefficient of friction with the chucking plate in contact therewith.

6 Claims, 4 Drawing Figures

FLOPPY DISC CHUCKING DEVICE

BACKGROUND OF THE INVENTION

The present invention relates to a floppy disc chucking device used in a floppy disc apparatus.

In floppy disc apparatuses, a floppy disc chucking device (hereafter referred to simply as chucking device) has recently been used. Such a device magnetically attracts and rotates a floppy disc as a magnetic recording medium (hereafter referred to as medium). In FIGS. 1 and 2 showing an example of such a prior art chucking device 10, a center pin 12 is pivotally supported by a bearing 14 attached to a base 16 and is rotated by a drive mechanism (not shown). A cylindrical hub 20 is tightly fitted on the center pin 12 so that the center pin 12 is inserted in a center hole 18 of the hub 20, and a medium 22 is fitted next to the hub 20 on the center pin 12 and pressed against the upper surface of a slip sheet 24 put on the top surface of the hub 20. A leaf spring 28 is attached at one end to the undersurface of the hub 20 by means of a screw 26. A cylindrical coupling pin 32 is attached to the other end of the leaf spring 28, which reaches the opposite side of the center pin 12. The coupling pin 32 extends above the top surface of the hub 20 through an opening 30 therein and is urged upward by the leaf spring 28. A suitable groove 34 is formed in the top surface of the hub 20. Fitted in the groove 34 is a substantially ring-shaped permanent magnet 36 cut at that portion thereof corresponding to the opening 30, as indicated by broken line in FIG. 1.

The medium 22 has a chucking plate 38 formed of a soft magnetic metal material at the central portion thereof. A center hole 40 receiving the center pin 12 is formed in the center of the chucking plate 38. Also, the chucking plate 38 has a coupling hole 42 through which is passed the extreme end portion of the coupling pin 32, which projects from the hub 20, urged by the leaf spring 28. When the center pin 12 and the coupling pin 32 are inserted in the center hole 40 and the coupling hole 42, respectively, the chucking plate 38 is attracted by the permanent magnet 36 independently of the coupling pin 32. Thus, the chucking plate 38 is pressed against the hub 20 through the slip sheet 24 thereon.

The hub 20 is formed of a light paramagnetic material, such as aluminum, while the slip sheet 24 is made of a low-friction, wear-resistant material, such as polytetrafluoroethylene.

A magnetic head 44 for side "0" and a magnetic head 46 for side "1", which cooperate with the medium 22, are attached to head arms 48 and 50, respectively, which extend from a carriage (not shown). Holding the medium 22 between them, the magnetic heads 44 and 46 are moved in the horizontal direction of FIG. 2. As the hub 20 is driven to rotate by the center pin 12, the medium 22 rotates held between the magnetic heads 44 and 46. In frictional contact with the medium 22, the magnetic heads 44 and 46 apply braking torque to the medium 22.

If the coupling pin 32 is located in the position indicated by an imaginary line 52 in FIG. 1, where it cannot be inserted into the coupling hole 42 of the chucking plate 38 after the medium 22 is put on the hub 20, so that the center pin 12 is inserted in the center hole 40 of the chucking plate 38, the chucking plate 38 is pulled toward the hub 20 by its own weight and the attraction of the permanent magnet 36. Accordingly, the coupling pin 32 is pressed down against the urging force of the leaf spring 38, so that the chucking plate 38 is pressed against the top surface of the hub 20 through the slip sheet 24. In this state, when the center pin 12 and the hub 20 are rotated by the drive mechanism (not shown), the medium 22 is subjected to driving torque which is attributed to the friction between the slip sheet 24 and the chucking plate 38. In the device of FIGS. 1 and 2, the braking torque applied to the medium 22 is greater than the driving torque, so that the medium 22 rotates at a lower speed than the hub 20, driven with the aid of the center pin 12, the hub 20, and the slip sheet 24. Accordingly, the coupling pin 32 moves in the direction indicated by an arrow 54, sliding on the undersurface of the chucking plate 38. When the coupling pin 32 reaches the position where it can be fitted in the coupling hole 42 of the chucking plate 38, it is caused to go up into the coupling hole 42 by the action of the leaf spring 28.

The coupling hole 42 is substantially in the form of a rectangle, consisting of two minor sides S1 and S2 parallel to a straight line C1–C2 connecting the central axis C1 of the center pin 12 shown in FIG. 1 and the center C2 of the coupling pin 32 fitted in the coupling hole 42 and located in the position of FIG. 1, two major sides S3 and S4 perpendicular to the minor sides S1 and S2, and rounded corners. The minor side S1 and the major side S3 are in contact with the coupling pin 32, while a gap lies between the coupling pin 32 and the minor and major sides S2 and S4. The coupling hole 42 is located so that the distance L2 (FIG. 1) between the outer major side S3 and the central axis C1 is a little shorter than the distance L1 (FIG. 2) between the outermost side portion of the coupling pin 32 and the central axis C1. In the position shown in FIG. 1, therefore, the coupling pin 32 is inclined, so that the chucking plate 38 is continually urged in the direction of arrow P of FIG. 1, and the edge of the center hole 42 is pressed against the center pin 12. Thus, the chucking plate 38 is located in a fixed position over the hub 20, so that the axis of the medium 22 and the center pin 12 are in alignment with each other.

In this state, the center pin 12 is driven by a motor (usually DC motor, not shown). When the coupling pin 32 is rotated as the center pin 12 rotates, the chucking plate 38 and hence the medium 22 rotate in the direction indicated by arrow N in FIG. 1. The accuracy of the positioning of the medium 22 over the hub 20 depends mainly on the magnitude and stability of the aforesaid driving torque and braking torque. The braking torque needs to be greater and steadier than the driving torque. The measured values of these two torques and related values are as follows. In a device subjected to the measurement, the braking torque based on the magnetic heads 44 and 46 ranges from 6 to 12 g·cm, and the force F of the magnet 36 to attract the chucking plate 38 ranges from 40 to 50 g. Further, the average distance r from the central axis C1 of the center pin 12 to each spot of the slip sheet 24 is 0.4 cm. If the coefficient of friction between the slip sheet 24 and the chucking plate 38 is $\mu$, therefore, the driving torque applied to the medium 22 is $\mu \cdot r \cdot F$ g·cm. This driving torque must be smaller than the braking torque (6 to 12 g·cm). Thus, there is a relation:

$$\mu \cdot r \cdot F \text{ (g·cm)} < 6 \sim 12 \text{(g·cm)}.$$

Accordingly, we have:

$$\mu \times 0.4 \times (40 \sim 50) < 6 \sim 12.$$

From the above expression, we obtain $\mu < 0.3 \sim 0.75$, that is, the value $\mu$ is determined to be less than 0.3.

In order to produce chucking devices which fulfill the above requirements, a thin sheet formed of a wear-resistant plastic material with a low coefficient of friction, such as polytetrafluoroethylene or polyester, has conventionally been used for the slip sheet 24. The slip sheet 24 is usually attached to the surface of the hub 20 by means of an adhesive agent or two-side adhesive tape. Therefore, the surface of the slip sheet 24 is susceptible to roughness attributed to the unevenness in thickness of the adhesive agent or adhesive tape or to the production of air bubbles between the slip sheet 24 and the hub 20. An actual measurement indicated that even if the roughness of the surface of the hub 20 is restricted to, for example, 10 microns or less, the surface of the slip sheet 24 is subject to a roughness of 40 to 50 microns. Such roughness may lead to variations in the contact condition between the medium 22 and the hub 20, depending on the position or elapsed time. After all, it is evident that the contact condition between the medium 22 and the magnetic heads 44 and 46 varies with the position of the medium 22 or with the passage of time, constituting a hindrance in the stabe read and write operation by the use of the magnetic heads 44 and 46. There has been an increasing demand for an improvement relating to these drawbacks.

SUMMARY OF THE INVENTION

The object of the present invention is to provide a floppy disc chucking device used in a floppy disc apparatus in which a medium is fixed to the surface of a hub by means of a magnet when it is rotated, and to eliminate the aforementioned drawbacks of the prior art floppy disc chucking device; the chucking device being capable of steadily maintaining the condition of contact between the medium and the hub and of securely maintaining the contact between the medium and magnetic heads for any surface portion of the medium or floppy disc and even for prolonged use.

In order to achieve the above object, a floppy disc chucking device according to the present invention is constructed so that the hub is formed of metal, and a wear-resistant coupling layer with a low coefficient of friction and a predetermined high hardness is formed at the surface of the hub against which is pressed a chucking plate of the floppy disc. The coupling layer is coupled to the chucking plate so that the surface of the former is directly in contact with the latter. The coupling layer is usually formed by hard-alumite processing or plastic coating with polytetrafluoroethylene.

With use of the coupling layer, the bond between the hub and the chucking plate is kept even and in a stable low-friction state for a long time, so that the cooperation of the magnetic heads and the floppy disc is steady and reliable.

DETAILED DESCRIPTION OF THE PREFERRED EMBODIMENT

Figure 1:
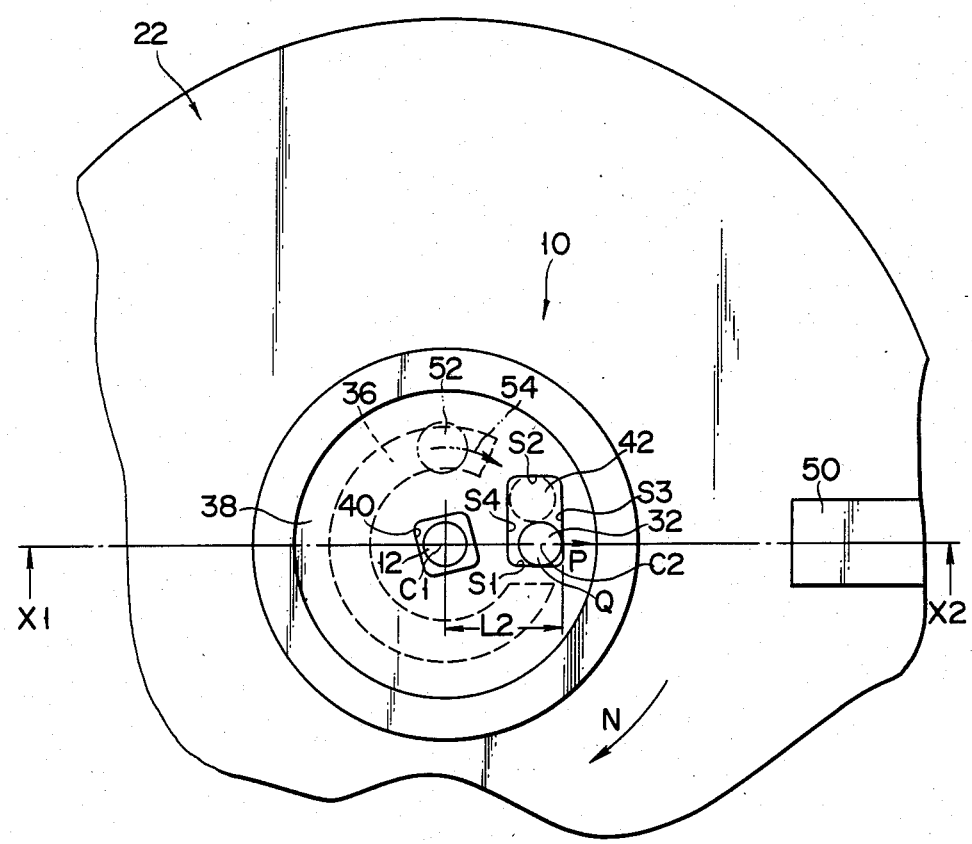
FIG. 1 is a plan view showing a prior art floppy disc chucking device and members associated therewith.
Figure 2:
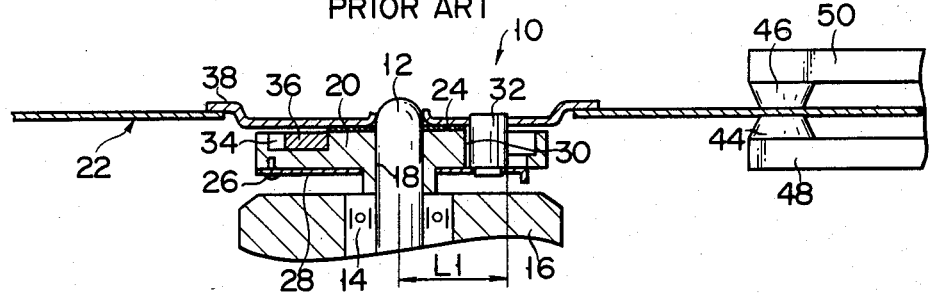
FIG. 2 is a side view showing a partial section of the chucking device of FIG. 1 and members associated therewith.
Figure 3:
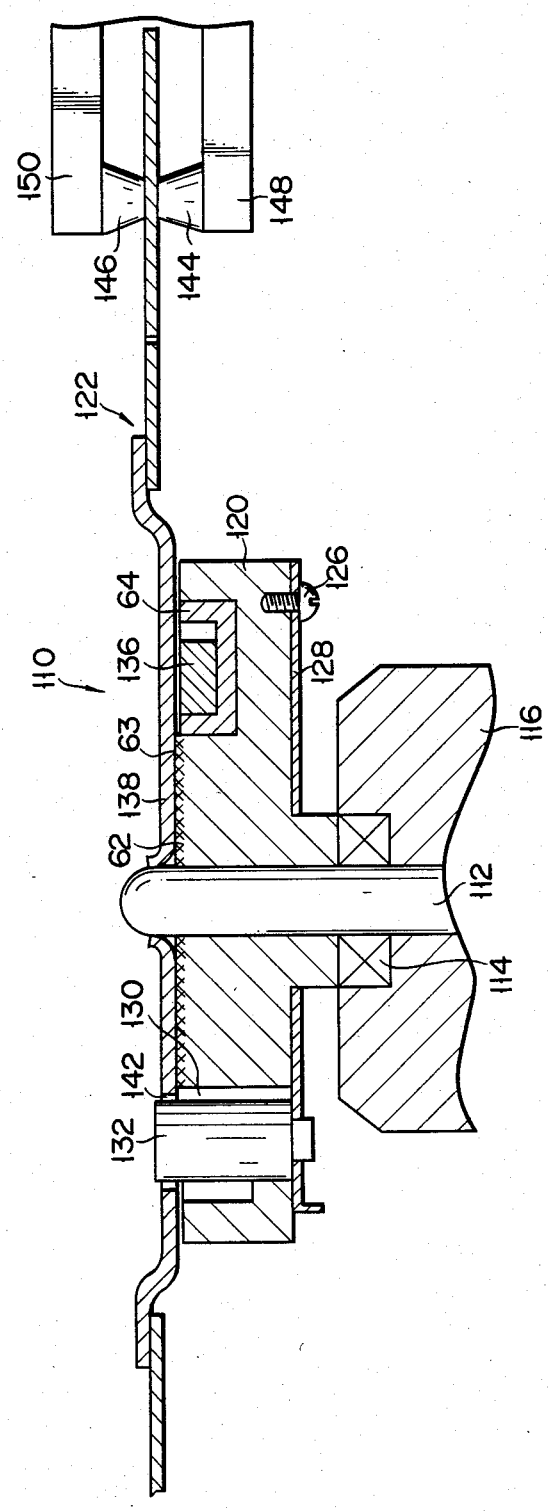
FIG. 3 is a side view showing a partial section of a chucking device according to the present invention and members associated therewith.

A chucking device 110 shown in FIG. 3 is substantially the same as the prior art chucking device 10 shown in FIGS. 1 and 2. In FIG. 3, like members as used in the chucking device 10 of FIGS. 1 and 2 are designated by three-digit numerals obtained by attaching a figure 1 as the hundreds digit to the left of those two-digit numerals which designate the corresponding members in FIGS. 1 and 2. The chucking device 110 of FIG. 3 differs from the chucking device 10 of FIGS. 1 and 2 essentially in that the slip sheet 24 is not used therein, and that a wear-coupling layer 62 with a low coefficient of friction and high hardness is formed at that portion of the top end of a hub 120 against which is pressed a chucking plate 138 of a medium 122. A plan view of the chucking device 110, which should be just the same as the drawing of FIG. 1, is omitted. Referring now to FIG. 3, the chucking device 110 will be described in brief.

The hub 120 shown in FIG. 3, which is formed of a light metal such as aluminum, is fitted on a center pin 112 as a center shaft. One end portion of a leaf spring 128 is attached to the undersurface of the hub 120 by means of a screw 126, while the other end portion is fitted with a coupling pin 132 which extends upward therefrom. Urged by the leaf spring 128, the coupling pin 132 projects upward through an opening 130 formed in the hub 120. A partially cut, ring-shaped permanent magnet 136 having substantially the same shape of the magnet 36 of FIG. 1 is attached to the top surface of the hub 120. The coupling layer 62 is formed by subjecting the top surface of the hub 120 to hardalumite processing or plastic coating with polytetrafluoroethylene. The coupling layer 62 has a thickness of approximately 50 microns and Vickers hardness of about 400. Thus, the coupling layer 62 forms a coupling surface 63 with a coefficient of friction of 0.3 or less against which the chucking plate 138 is pressed for coupling.

A yoke 64 with a channel-shaped cross section, which extends around the permanent magnet 136 shown in FIG. 3, cooperates with the permanent magnet 136 so that the latter strongly attracts the chucking plate 138 of the medium 122 placed on the hub 120. The use of such a yoke 64 is particularly effective if the hub 120 is formed of aluminum.

After the medium 122 is placed on the hub 120, the same operation as described in connection with FIGS. 1 and 2 is performed until the coupling pin 132 is fitted in the coupling hole 142 of the chucking plate 138, as shown in FIG. 3.

The coefficient of friction between the coupling surface 63 of the hub 120 and the chucking plate 138, pressed against each other as show in FIG. 3, is lower than braking torque produced by magnetic heads 144 and 146, so that the medium 122 may be located in a predetermined position on the hub 120 with high accuracy. If the coupling layer 62 is formed by hard-alumite processing, the surface conditions may vary with the grade of the processing. In this case, if the coupling surface 63 is subject to roughness of, e.g., 10 microns or thereabout, the state of contact between the medium 122 attracted to the hub 120 and the magnetic heads 144 and 146 will be stabilized for reliable operation of the floppy disc apparatus since there will be no plastic film or adhesive agent between the hub 120 and the chucking plate 138. The coupling surface 63 of the hub 120 is so hard that it can be prevented from being damaged by contact with the medium 122 and can maintain smoothness for a relatively long time.

Figure 4:
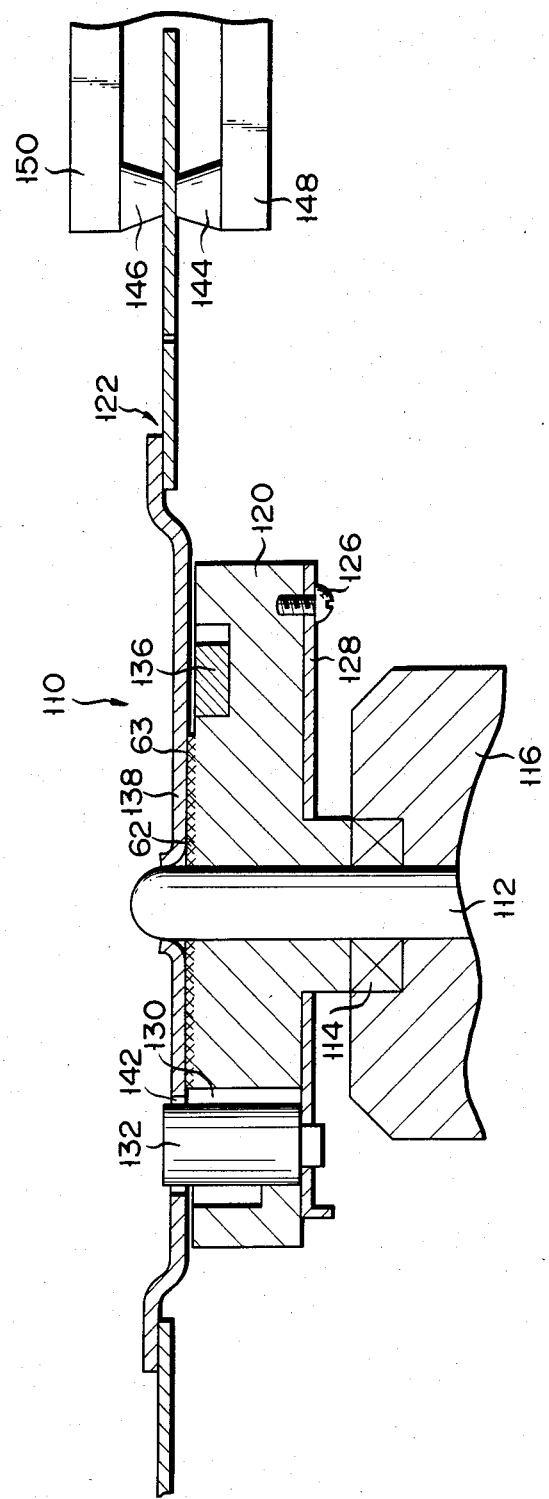
FIG. 4 is a side view showing a modification of the chucking device of FIG. 3.

FIG. 4 shows a modified form of the mechanism of FIG. 3. The difference between the mechanisms of FIGS. 3 and 4 lies in that the hub 120 shown in FIG. 4 is formed of a soft magnetic metal as compared with aluminum for the hub 120 of FIG. 3. Thus, in the modification of FIG. 4, the permanent magnet 136 is not provided with a yoke for improving the capacity of the magnet 136. In other respects, the mechanism of FIG. 4 is the same as the mechanism of FIG. 3, so that a detailed description of its construction and function is omitted.

What is claimed is:

1. A floppy disc chucking device used in a floppy disc apparatus, comprising:
    a hub mounted on a center pin for rotation; and
    driving means for rotating the center pin, said hub including a coupling layer having a coupling surface in contact with a metallic chucking plate at the central portion of a floppy disc and magnetic means for attracting the chucking plate so that the chucking plate is pressed against the coupling surface of the hub; and
    said hub being surface-processed so that the coupling layer has a predetermined thickness and a predetermined high hardness and that the coupling surface provides a low coefficient of friction with the chucking plate of the floppy disc pressed against the same.

2. The floppy disc chucking device according to claim 1, wherein said surface processing applied to the hub is hard-alumite surface processing.

3. The floppy disc chucking device according to claim 1, wherein said surface processing applied to the hub is a plastic coating with polytetrafluoroethylene.

4. The floppy disc chucking device according to claim 1, wherein said surface-processed coupling layer has a thickness of approximately 50 microns and Vickers hardness of approximately 400, and the coefficient of friction between the coupling layer and the chucking plate of the floppy disc is approximately 0.3 or less.

5. A floppy disc chucking device used in a floppy disc apparatus comprising:
    a hub mounted on a center pin for rotation; and
    driving means for rotating the center pin, said hub including a coupling layer having a coupling surface in contact with a metallic chucking plate at the central portion of a floppy disc, and magnetic means for attracting the chucking plate so that the chucking plate is pressed against a coupling surface of the hub; and
    said hub being hard-alumite surface-processed so that the coupling layer has a predetermined thickness and a predetermined high hardness and that the coupling surface provides a low coefficient of friction with the floppy disc chucking plate pressed against it.

6. The floppy disc chucking device according to claim 5, wherein said surface-processed coupling layer has a thickness of approximately 50 microns and Vickers hardness of approximately 400, and the coefficient of friction between the coupling layer and the chucking plate of the floppy disk is approximately 0.3 or less.

* * * * *